(12) United States Patent
Takahashi

(10) Patent No.: US 7,333,108 B2
(45) Date of Patent: Feb. 19, 2008

(54) ENTERTAINMENT APPARATUS, OBJECT DISPLAY DEVICE, OBJECT DISPLAY METHOD, RECORDING MEDIUM AND CHARACTER DISPLAY METHOD

(75) Inventor: Keijiro Takahashi, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 114 days.

(21) Appl. No.: 11/249,673

(22) Filed: Oct. 12, 2005

(65) Prior Publication Data

US 2006/0103646 A1    May 18, 2006

(30) Foreign Application Priority Data

Nov. 16, 2004    (JP)    ............................. 2004-332081

(51) Int. Cl.
*G06T 15/00* (2006.01)

(52) U.S. Cl. ........................ 345/427; 345/419; 345/420

(58) Field of Classification Search ................ 345/419, 345/420, 422, 426, 629, 630, 632, 633, 427
See application file for complete search history.

(56) References Cited

U.S. PATENT DOCUMENTS

| | | | |
|---|---|---|---|
| 6,104,402 A * | 8/2000 | Goddard et al. ............ | 345/419 |
| 6,425,826 B1 * | 7/2002 | Nakanishi et al. ............ | 463/31 |
| 6,628,283 B1 * | 9/2003 | Gardner ....................... | 345/427 |
| 6,670,963 B2 * | 12/2003 | Osberger ..................... | 345/629 |
| 6,710,774 B1 * | 3/2004 | Kawasaki et al. .......... | 345/419 |
| 6,756,919 B2 * | 6/2004 | Endo et al. ............. | 340/995.14 |
| 7,184,609 B2 * | 2/2007 | Liu et al. ..................... | 382/276 |
| 7,193,629 B2 * | 3/2007 | Kake et al. ................. | 345/581 |
| 7,193,730 B2 * | 3/2007 | Higashi et al. ............. | 356/615 |

* cited by examiner

*Primary Examiner*—Phu K. Nguyen
(74) *Attorney, Agent, or Firm*—Katten Muchin Rosenman LLP

(57) ABSTRACT

An entertainment system 10 has: a depth computing module 210 which computes a viewpoint distance from viewpoint coordinate to an object; a scaling computing module 208 which computes scaling for a unique size of the object based on the viewpoint distance; a model transforming module 206 which multiples the unique size of the object by the scaling, computes the size of the object, and arranges the object in the computed size; a view transforming module 214 which transforms the arranged object to a viewpoint coordinate system; a perspective transformation module 216 which perspective transforms the transformed object to a screen coordinate system relative to an origin point of the viewpoint coordinate system; and an image output module 218 which displays a part of the screen coordinate system where the object has been perspective transformed on a display 12, the system can properly display an object separated from the viewpoint coordinate by a predetermined distance.

11 Claims, 6 Drawing Sheets

204

| OBJECT ID (2040) | COMPUTATION RULE (2042) | VERTEX COORDINATES (2044) |
|---|---|---|
| 0001 | $f(x)$ | $(x_1,y_1,z_1)$, $(x_2,y_2,z_2)$, $(x_3,y_3,z_3)$, $(x_4,y_4,z_4)$, ··· |
| 0002 | $g(x)$ | $(x_5,y_5,z_5)$, $(x_6,y_6,z_6)$, $(x_7,y_7,z_7)$, $(x_8,y_8,z_8)$, ··· |
| 0003 | NULL | $(x_9,y_9,z_9)$, $(x_{10},y_{10},z_{10})$, $(x_{11},y_{11},z_{11})$, $(x_{12},y_{12},z_{12})$, ··· |
| ⋮ | ⋮ | ⋮ |

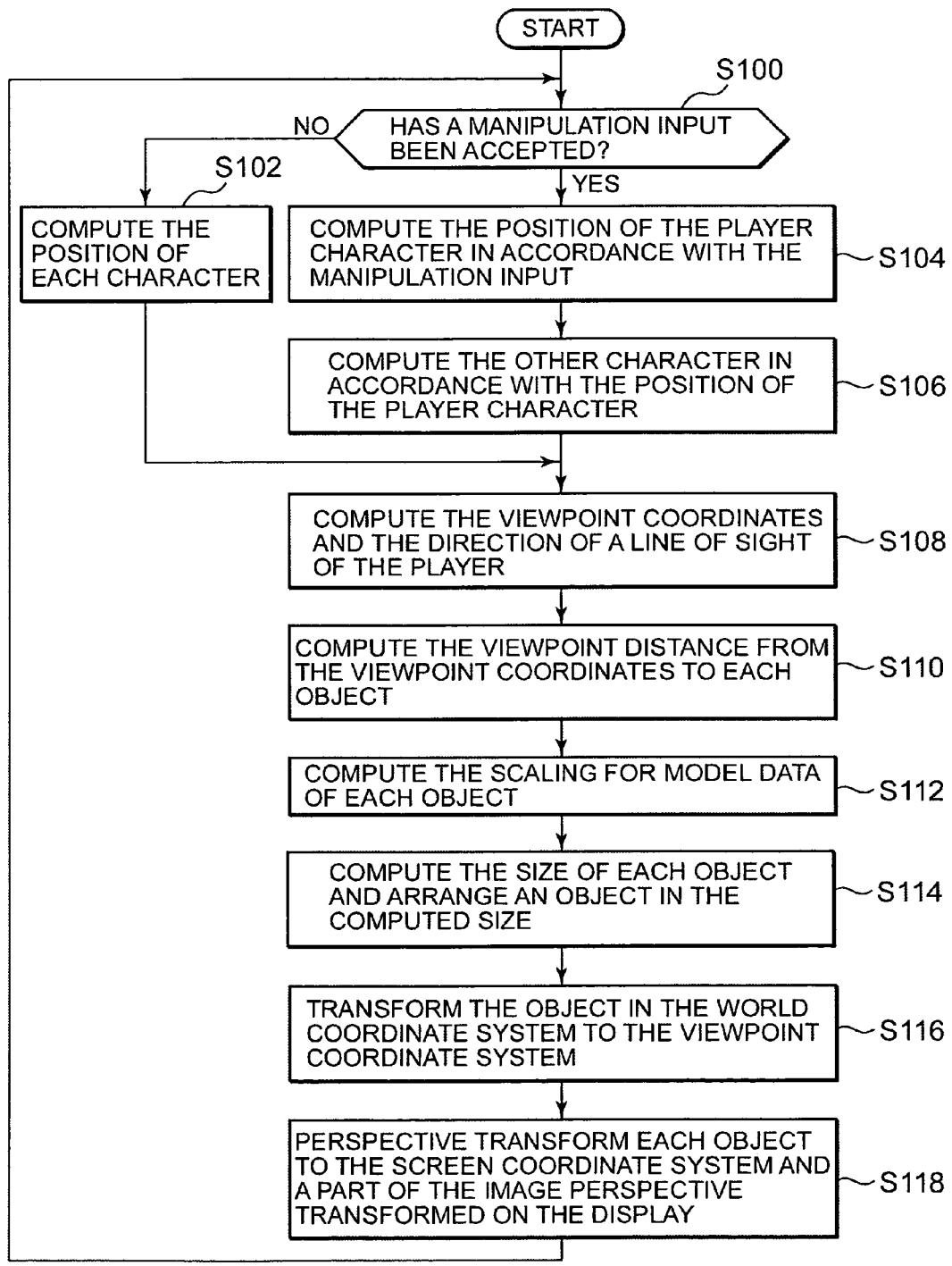

ENTERTAINMENT APPARATUS, OBJECT DISPLAY DEVICE, OBJECT DISPLAY METHOD, RECORDING MEDIUM AND CHARACTER DISPLAY METHOD

BACKGROUND OF THE INVENTION

The present invention relates to object display technology in three-dimensional images.

Conventionally, a technique is known that an object arranged in a world coordinate system is perspective transformed to a screen coordinate system. In the conventional technique, the object arranged in the world coordinate system is transformed to a viewpoint coordinate system in which the coordinates of a viewpoint in the world coordinate system are an origin point and the direction of a line of sight is a z-axis. Then, the object transformed to the viewpoint coordinate system is projected onto the screen coordinate system which is a plane vertical to the z-axis in the viewpoint coordinate system relative to the origin point of the viewpoint coordinate system.

In the conventional technique, each object has multiple vertex coordinates defined in a unique local coordinate system that is defined by three-dimensional coordinates. The origin point of a local coordinate system corresponding to each object is arranged at the coordinates in the world coordinate system where each object is to be arranged, and thus each of the vertex coordinates defined in the local coordinate system of each object is associated with the coordinates in the world coordinate system. Therefore, each object is arranged in the world coordinate system.

Subsequently, each of the vertex coordinates of each object in the world coordinate system is individually transformed to the viewpoint coordinate system, and then each object is transformed from the world coordinate system to the viewpoint coordinate system. Furthermore, each of the vertex coordinates of each object in the viewpoint coordinate system is projected onto the screen coordinate system relative to the origin point of the viewpoint coordinate system, and thus each object in the viewpoint coordinate system is perspective transformed to the screen coordinate system.

In this manner, each object in the viewpoint coordinate system is perspective transformed to the screen coordinate system relative to the origin point of the viewpoint coordinate system. Therefore, an object at a long distance from the viewpoint coordinate is projected onto the screen coordinate system small, whereas an object at a short distance from the viewpoint coordinate is projected onto the screen coordinate system large. Accordingly, how each object in the world coordinate system is seen from the viewpoint coordinate in the world coordinate system can be truly reproduced so as to match with the real world.

SUMMARY OF THE INVENTION

However, when an object positioned at the coordinates apart to some extent from the viewpoint coordinate in the world coordinate system is shown in the screen coordinate system, an object projected onto the screen coordinate system is displayed small. In this case, suppose a part of the screen coordinate system is shown on a display and the like, a person who sees the object shown on the display sometimes has difficulty to know what the object is. Furthermore, when there are multiple objects, it is sometimes difficult to tell the individual objects from each other. Particularly, in a game machine that operates a game to aim and shoot a distant target, it is difficult for a user of the game machine to tell a target apart to some extent from the viewpoint coordinate for limitation on game flexibility.

Moreover, even in the case where it is difficult to tell an object shown on a display because the object is too small after perspective transformed, each of the vertex coordinates of each object in the viewpoint coordinate system is perspective transformed to the screen coordinate system in a game machine and the like. Therefore, when multiple objects are shown, load of the game machine is sometimes increased.

Then, an object of the invention is to provide an entertainment apparatus, an object display device, an object display method, a recording medium, and a character display method which can solve the problems. For example, the size of an object to be arranged in a world coordinate system is varied to show the object on a display in a proper size.

In order to solve the problems, an object display device according to the invention decides the size of an object to be arranged in a world coordinate system in accordance with a distance from the viewpoint coordinate to the object in a world coordinate system, or a distance from the viewpoint coordinate to the object in the direction of a line of sight.

For example, an object display device is provided which transforms an object that is arranged in a world coordinate system and has a unique size defined by three-dimensional coordinates to a viewpoint coordinate system where viewpoint coordinate defined by the world coordinate system are an origin point and a direction of a line of sight from the viewpoint coordinate is a z-axis, perspective transforms the transformed object to a screen coordinate system being a plane vertical to the z-axis of the viewpoint coordinate system relative to the origin point of the viewpoint coordinate system, and displays a part of the screen coordinate system where the object has been perspective transformed on a display, the object display device including:

a depth computing module which computes a viewpoint distance that is a distance from the viewpoint coordinate to the object, or a distance from the viewpoint coordinate to the object in the world coordinate system in the direction of a line of sight;

a scaling computing module which uses a predetermined rule to compute scaling for a unique size of the object based on the viewpoint distance computed by the depth computing module;

an object arranging module which multiplies the unique size of the object by the scaling computed by the scaling computing module to compute the size of the object and arranges the object in the computed size in the world coordinate system;

a view transforming module which transforms the object arranged in the world coordinate system by the object arranging module to the viewpoint coordinate system;

a perspective transformation module which perspective transforms the object transformed by the view transforming module to a screen coordinate system relative to the origin point of the viewpoint coordinate system; and a display control module which displays a part of the screen coordinate system where the object is perspective transformed by the perspective transformation module on the display.

According to the object display device of the invention, perspective transformation is conducted after the size of the object is changed in accordance with the distance from the viewpoint coordinate to the object, or the distance from the viewpoint coordinate to the object in the direction of a line of sight. Therefore, when the size of the object is increased as the distance from the viewpoint coordinate to the object, or the distance from the viewpoint coordinate to the object in the direction of a line of sight is increased, how the object is seen from the viewpoint coordinate can be controlled regardless of the laws of perspective. Accordingly, the object display device according to the invention can increase the expressive power of the object.

BRIEF DESCRIPTION OF THE DRAWINGS

FIG. 8 is a flow chart illustrating an exemplary operation of the entertainment apparatus 20.

DESCRIPTION OF THE PREFERRED EMBODIMENT

Hereinafter, one embodiment according to the invention will be described.

Figure 1:
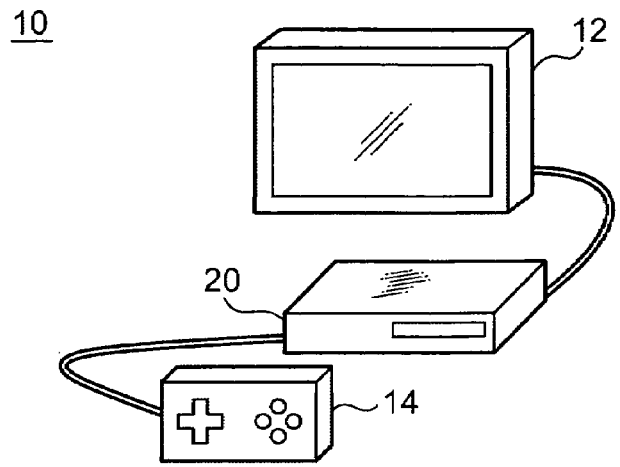
FIG. 1 is a diagram illustrating the system configuration of an entertainment system 10 of an embodiment according to the invention.

FIG. 1 depicts the system configuration of an entertainment system 10 of an embodiment according to the invention. The entertainment system 10 has a display 12, a control device (controller) 14, and an entertainment apparatus 20. The display 12 displays an image of a game generated by the entertainment apparatus 20. Furthermore, the display 12 has a sound output module which regenerates sounds such as voice, music, and sound effects accompanying the game generated by the entertainment apparatus 20. The control device 14 transforms manipulations by a user to electric signals, sends them to the entertainment apparatus 20, and thus allows the user to control the entertainment apparatus 20.

The entertainment apparatus 20 displays a game image on the display 12 in accordance with a program inside as well as regenerates sounds such as voice, music, and sound effects accompanying the game image by the sound output module in the display 12. The entertainment apparatus 20 may have a capability to regenerate sounds such as voice, music, and sound effects recorded in a recording medium such as CD other than games, and a capability to regenerate moving picture including sounds recorded in a recording medium such as DVD.

Figure 2:
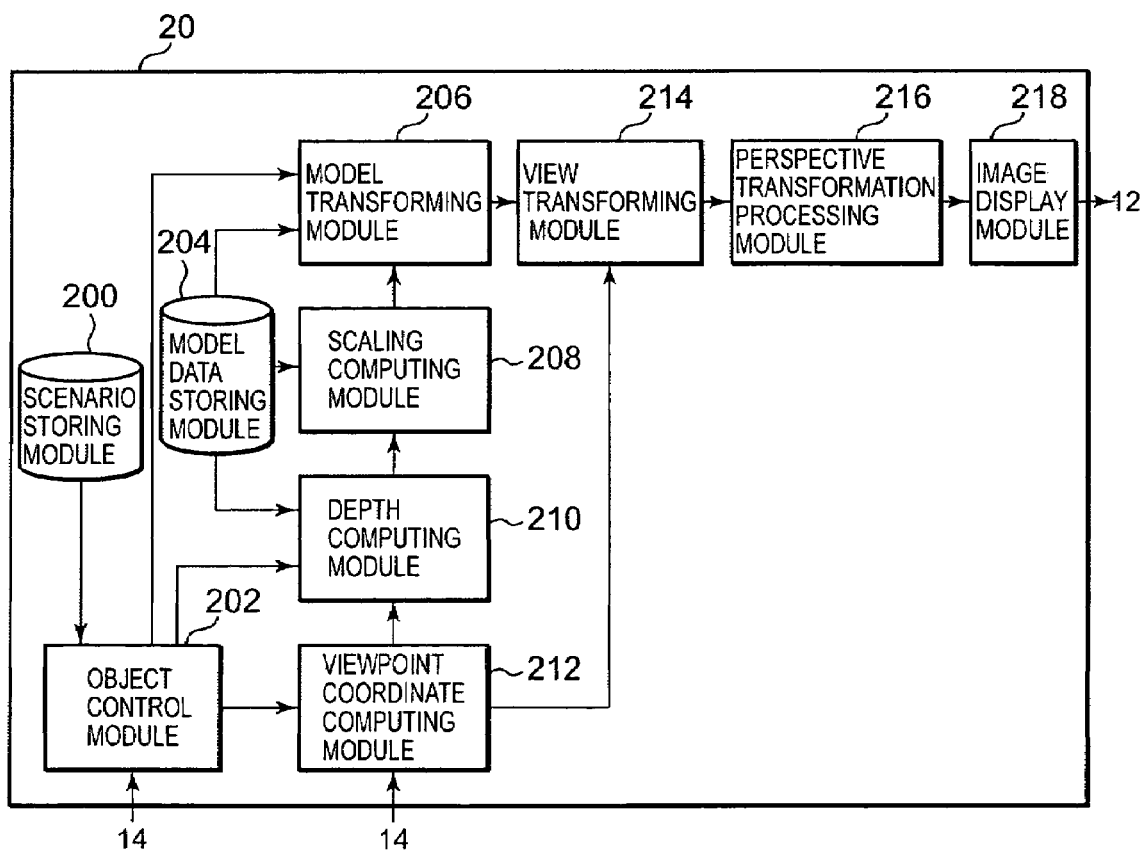
FIG. 2 is a block diagram illustrating an exemplary functional configuration of an entertainment apparatus 20.

FIG. 2 depicts a block diagram illustrating an exemplary functional configuration of the entertainment apparatus 20. The entertainment apparatus 20 has a scenario storing module 200, an object control module 202, a model data storing module 204, a model transforming module 206, a scaling computing module 208, a depth computing module 210, a view computing module 212, a view transforming module 214, a perspective transformation module 216, and an image output module 218. The scenario storing module 200 stores a game scenario. The model data storing module 204 stores and associates model data of each of multiple objects to be displayed on a game and information indicating the unique operation of each object with an object ID which identifies each object. Here, model data of the object is multiple vertex coordinates defined in a local coordinate system unique to each object.

The object control module 202 accepts a manipulation input from the user through the control device 14, and generates the coordinates of the object that are position information of each object in a world coordinate system in accordance with the game scenario stored in the scenario storing module 200. The view computing module 212 accepts the manipulation input of the user from the control device 14, and computes viewpoint coordinate in the world coordinate system and a direction of a line of sight at the viewpoint coordinate in accordance with the coordinates of each object controlled by the object control module 202 based on the scenario stored in the scenario storing module 200.

The depth computing module 210 receives the coordinates of each object in the world coordinate system from the object control module 202 along with the object ID of the corresponding object, and receives the viewpoint coordinate in the world coordinate system and the direction of a line of sight from the view computing module 212. Then, the depth computing module 210 individually computes a viewpoint distance that is a distance from the viewpoint coordinate to the coordinates of each object in the direction of a line of sight. Here, the distance in the direction of a line of sight is a distance between a viewpoint coordinate and the coordinates of a point which a plane including the coordinates of the object and is vertical to a straight line including the direction of a line of sight intersects with a straight line including the direction of a line of sight. Moreover, the coordinates of the object are an origin point of a local coordinate system unique to the object, for example. In addition, as another example, the depth computing module 210 may individually compute the distance from the viewpoint coordinate to the coordinates of each object as the viewpoint distance.

The model data storing module 204 in advance stores and associates information that indicates whether to do a computation process for the viewpoint distance by the depth computing module 210 and a scaling computation rule that is used when the scaling computing module 208 computes scaling for the corresponding object with the object ID. The depth computing module 210 receives position information about each object along with the object ID from the object control module 202, refers to the model data storing module 204, and individually computes the viewpoint distance only for the object associated with an information to do the computation process for the viewpoint distance. Then, the model data storing module 204 sends the computed viewpoint distance to the scaling computing module 208 along with the object ID of the object corresponding to the viewpoint distance.

The scaling computing module 208 individually computes scaling for the unique size that is defined by three-dimensional coordinates based on the viewpoint distance of each object computed by the depth computing module 210 and the scaling computation rule stored in the model data storing module 204. Then, the scaling computing module 208 sends the computed scaling to the model transforming module 206 along with the object ID of the object corresponding to the scaling.

The model transforming module 206 receives the scaling for each object computed by the scaling computing module 208 along with the object ID of the corresponding object. Subsequently, the model transforming module 206 refers to the model data storing module 204, and multiplies model data of the corresponding object ID by the received scaling to compute a new size of each object. Then, the model transforming module 206 arranges the object in the computed new size in the world coordinate system based on the coordinates of each object computed by the object control module 202. Here, when the model transforming module 206 receives information indicating two times as scaling for a particular object, for example, the model transforming module 206 doubles the value of each of the vertex coordinates at the unique local coordinates stored as model data in the model data storing module 204. In the above case, for simplicity, for example, suppose the model data storing module 204 stores (0,0,0), $(x_1, y_1, z_1)$, $(x_2, y_2, z_2)$, $(x_3, y_3, z_3)$ as each of the vertex coordinates of a particular object, the model transforming module 206 arranges an object having each of the vertex coordinates (0,0,0), $(2x_1, 2y_1, 2z_1)$, $(2x_2, 2y_2, 2z_2)$, $(2x_3, 2y_3, 2z_3)$ in the world coordinate system.

In addition, for objects other than the object corresponding to the object ID received from the scaling computing module 208, the model transforming module 206 arranges model data stored in the model data storing module 204 in the world coordinate system as it is. Therefore, since the computation process for the viewpoint distance and scaling for the object that is unnecessary to change scaling can be bypassed, the processing load of the entertainment apparatus 20 can be reduced. Furthermore, as another example, the depth computing module 210 may individually compute all the viewpoint distance for the objects that position information has been received from the object control module 202, and allow the scaling computing module 208 to compute the scaling for all the objects based on the computed viewpoint distance.

Moreover, in the embodiment, when the model transforming module 206 receives zero as the scaling for an object from the scaling computing module 208, it does not arrange the corresponding object in the world coordinate system. Besides, as another example, when the scaling for the object received from the scaling computing module 208 is a predetermined value or below, the model transforming module 206 may not arrange the corresponding object in the world coordinate system.

The view transforming module 214 transforms each object arranged in the world coordinate system by the model transforming module 206 to a viewpoint coordinate system where the viewpoint coordinate in the world coordinate system computed by the view computing module 212 is an origin point and the direction of a line of sight from the viewpoint coordinate is the z-axis. The perspective transformation module 216 perspective transforms each of the vertex coordinates of the object in the viewpoint coordinate system transformed by the view transforming module 214 to a screen coordinate system that is a plane vertical to the z-axis in the viewpoint coordinate system relative to the origin point of the viewpoint coordinate system. The image output module 218 displays a part of a two-dimensional image perspective transformed to the screen coordinate system on the display 12.

Figures 3, 4:
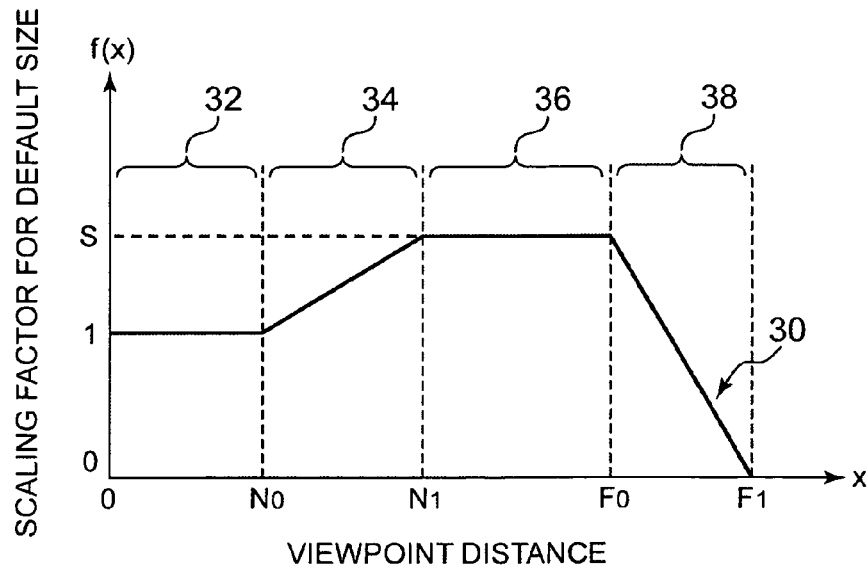
FIG. 3 is a diagram illustrating an exemplary data structure which is stored in a model data storing module 204.
FIG. 4 is a diagram illustrating an exemplary function 30 which is used by a scaling computing module 208 to determine scaling from a viewpoint distance.

FIG. 3 depicts an exemplary data structure stored in the model data storing module 204. The model data storing module 204 stores and associates a computation rule 2042 and vertex coordinates 2044 with an object ID 2040 which identifies each object. The computation rule 2042 stores scaling computation rules applied to the corresponding object by the scaling computing module 208. In the embodiment, when NULL data is stored as the computation rule 2042, the depth computing module 210 does not apply the computation process for the viewpoint distance to the corresponding object. The vertex coordinates 2044 store model data that is each of the vertex coordinates predefined in a local coordinate system unique to a corresponding character.

By referring to the model data storing module 204, the depth computing module 210 can determine whether to compute the viewpoint distance for the object corresponding to the object ID received along with position information from the object control module 202. Thus, the model data storing module 204 can inhibit the scaling computing module 208 from changing the size of an object having a strong relationship with an object that is not changed from the size defined by the vertex coordinates 2044. Therefore, strangeness on display can be reduced, for example, the size of the object defined by the vertex coordinates 2044 is changed in accordance with the viewpoint distance and thus an object climbing up a tree is greater than that tree.

FIG. 4 depicts an exemplary function 30 used when the scaling computing module 208 determines scaling from the viewpoint distance. The function 30 has a property expressed by the following Equation 1, for example. Here, x expresses the viewpoint distance that is the distance from the viewpoint coordinate to the coordinates of an object in a direction of a line of sight, and f(x) expresses the scaling for model data at the viewpoint distance x. S is a constant indicating the maximum value of the scaling for model data. $N_0$, $N_1$, $F_0$ and $F_1$ individually indicate a specific viewpoint distance, having the relationship $0<N_0<N_1<F_1<F_1$.

Equation 1

$$f(x) = \begin{cases} 1 & (x \leq N_0) \\ 1 + \dfrac{(S-1)(x-N_0)}{N_1 - N_0} & (N_0 < x < N_1) \\ S & (N_1 \leq x \leq F_0) \\ S \times \dfrac{F_1 - x}{F_1 - F_0} & (F_0 < x < F_1) \\ 0 & (F_1 \leq x) \end{cases}$$

In the function 30, in an area 32 where the viewpoint distance is greater than zero and equal to or below $N_0$, the scaling for model data of the object is one. In an area 34 where the viewpoint distance is greater than $N_0$ and equal to or below $N_1$, the scaling for model data is increased within the range from one to S in accordance with the viewpoint distance is increased. In an area 36 where the viewpoint distance is greater than $N_1$ and equal to or below $F_0$, the scaling for model data in N, remains as S regardless of the viewpoint distance. In an area 38 where the viewpoint distance scaling is from $F_0$ to $F_1$, the scaling for model data is decreased as the viewpoint distance is increased from S to zero. In the range where the viewpoint distance is $F_1$ or greater, the scaling for model data is zero.

In this manner, the scaling computing module 208 increases the scaling for model data than one as the viewpoint distance is increased in the area 34 where the viewpoint distance is ranged from $N_0$ to $N_1$. Therefore, the model transforming module 206 can display an object in the range where the viewpoint distance is ranged from $N_0$ to $N_1$ greater than in the size displayed in the screen coordinate system by transforming model data arranged in the world coordinate system to the viewpoint coordinate system and perspective transforming the transformed model data. Here, for example, in a game that aims and shoots a target character running away, it is necessary to display the target character apart to some extent from a viewpoint position on the screen so that the character is easily distinguished from other objects. However, when normal perspective transform is conducted, it is sometimes difficult to see a target character at a distant position. On the contrary, the invention can scale up the size of an object apart to some extent more than model data in accordance with the viewpoint distance. Thus, the target character at a distant position from the viewpoint position can be displayed more distinguishably.

Furthermore, the scaling computing module 208 sets the scaling for model data to zero regardless of the viewpoint distance in the range where the viewpoint distance is $F_1$ or greater. Here, in the conventional image display device, an object is perspective transformed in accordance with the viewpoint distance, and when the size of the object on the screen after perspective transformed is equal to or below a predetermined size, a process of not displaying the object on the screen is conducted to prevent the entire image from being difficult to distinguish because the object that is too small to distinguish is shown on the screen. However, in the image display device like this, when the size of the object after perspective transformed is below a predetermined size, the perspective transformation process done for that object is sometimes wasted, causing an increase in the processing load of the image display device. On the other hand, in the entertainment apparatus 20 shown in the embodiment, the scaling for model data of the object having the viewpoint distance of $F_1$ or greater is set to zero, and thus the object can be determined whether to be arranged in the world coordinate system before perspective transform. Therefore, the object not to be displayed as a result can be prevented from being perspective transformed in vain, and the processing load of the entertainment apparatus 20 can be reduced.

In addition, the scaling computing module 208 reduces the scaling for model data as the viewpoint distance is increased in the area 38 where the viewpoint distance is ranged from $F_0$ to $F_1$. Thus, as the conventional image display device described above, in the case where the process of not displaying the object on the screen is done when the size of the object on the screen after perspective transformed is a predetermined size or below, the entertainment apparatus 20 of the embodiment can reduce the number of the objects to be displayed on the screen more quickly than the conventional one by reducing the scaling for model data as the viewpoint distance is increased. Therefore, the entertainment apparatus 20 of the embodiment can reduce the processing load.

Furthermore, in the case where the invention is adapted to a game that aims and shoots a target character at a distance, preferably, the model transforming module 206 also changes the size defined by model data as well as the size of a collision model that is defined by each object and used to determine whether the objects are contacted with each other, when the object corresponding to the target character is varied from the size defined by model data. Here, the collision model is a space that is surrounded by a polygon having vertex coordinates defined in the local coordinate system and fewer than the corresponding object. The collision model is configured in the local coordinate system so as to include at least a part of a space surrounded by multiple vertex coordinates of model data of the object. Contact of objects is determined whether collision models having a simpler shape than the object are contacted with each other or overlapped with each other, or the coordinates of a representative point predetermined with respect to one object are contacted with or overlapped with the collision model of the other object on the world coordinate system. Therefore, contact or overlap of the objects arranged in the world coordinate system can be determined more quickly.

For example, the collision model may be stored beforehand in the model data storing module 204 as associated with each object ID. In this case, the model transforming module 206 applies the scaling received from the scaling computing module 208 to model data of the object as well as to the corresponding collision model. In addition, as another example, the model data storing module 204 may store the computation rule for scaling at every collision model. In this case, the scaling computing module 208 may apply to the collision model the scaling computation rule different from the scaling computation rule that is applied to the object.

Moreover, preferably, the position of $F_1$ in the function 30 is decided in accordance with the number of the objects shown on the display 12 by the image output module 218. For example, the object control module 202 has a capability to count the number of the objects shown on the display 12 at one time, and notifies the scaling computing module 208 of the number of the objects counted along with position information about the object. The scaling computing module 208 brings the position of $F_1$ close to the viewpoint position in the function 30 as the number of the objects is greater based on the number of the objects received from the object control module 202. Thus, the number of the objects to be shown on the display 12 can be reduced, and the entertainment apparatus 20 can prevent the processing load from increasing. Furthermore, the position of $F_0$ in the function 30 may also be decided in accordance with the number of the objects to be shown on the display 12 by the image output module 218.

Moreover, in the embodiment, the function 30 in the area 34 and the function 30 in the area 38 are expressed by a straight line but it may be a curve based on a predetermined condition. Besides, the function 30 of the embodiment reduces the scaling for the object from S to zero in the area 38 where the viewpoint distance is ranged from $F_0$ to $F_1$. As another example, the function 30 may leave the scaling S for the object at $N_1$ in the range greater than $N_1$ regardless of the viewpoint distance. In addition, the function 30 of the embodiment increases the scaling for the object from one to S in the area 34 where the viewpoint distance is greater than $N_0$ and is $N_1$ or below. As another example, the function 30 may reduce the scaling for the object from one to zero in the range greater than $N_0$ and $F_3$, not shown, and set the scaling for the object to zero in the range where the viewpoint distance is $F_3$ or greater.

Figure 5A:
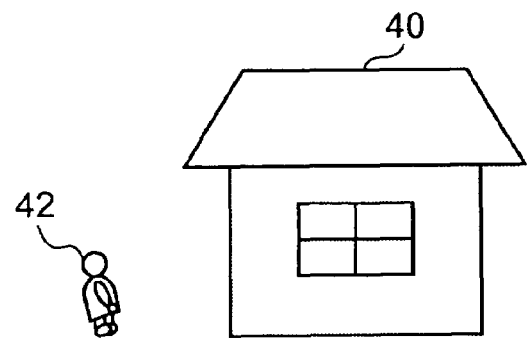
FIG. 5A and FIG. 5B are conceptual diagrams illustrative of an exemplary size of a character 42 in an area 32 where a viewpoint distance is ranged from 0 to $N_1$.
Figure 5B:
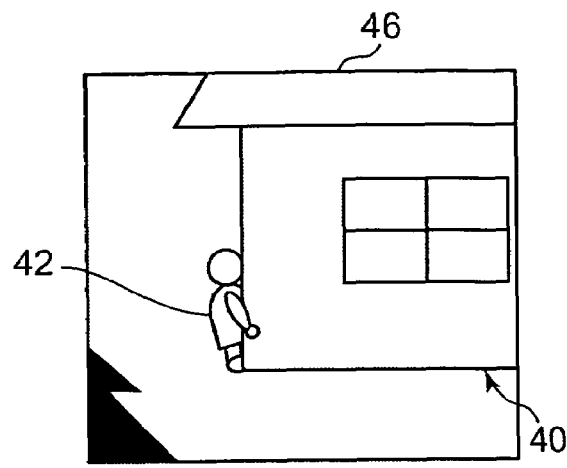

FIG. 5A and FIG. 5B depict conceptual diagrams illustrative of an exemplary size of a character 42 in the area 32 where the viewpoint distance is ranged from zero to $N_1$. FIG. 5A depicts a house 40 and the character 42 that are objects arranged in the world coordinate system by the model transforming module 206. FIG. 5B depicts a display image 46 shown on the display 12. In the embodiment, suppose the model data storing module 204 associates NULL data as a scaling computation rule with the object ID of the object corresponding to the house 40, and associates a predetermined scaling computation rule with the object ID of the object corresponding to the character 42.

Since the scaling computing module 208 computes the scaling for the object corresponding to the character 42 as one in the area 32 where the viewpoint distance is ranged from zero to No, the model transforming module 206 arranges model data of the objects corresponding to the house 40 and the character 42 in the world coordinate system (see FIG. 5A). Then, multiple objects including the house 40 and the character 42 arranged in the world coordinate system are transformed to the viewpoint coordinate system by the view transforming module 214, perspective transformed to the screen coordinate system by the perspective transformation module 216, and displayed on the display 12 as the display image 46 by the image output module 218 (see FIG. 5B).

Figure 6A:
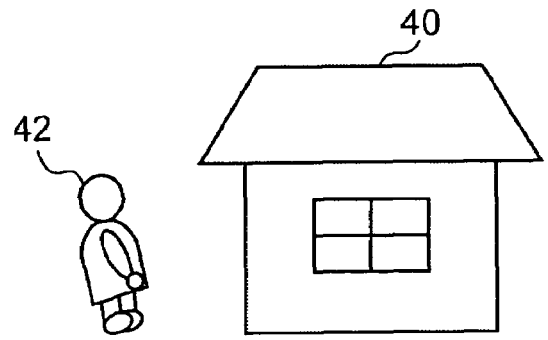
FIG. 6A and FIG. 6B are conceptual diagrams illustrative of an exemplary size of the character 42 in an area 34 where a viewpoint distance is ranged from $N_0$ to $N_1$.
Figure 6B:
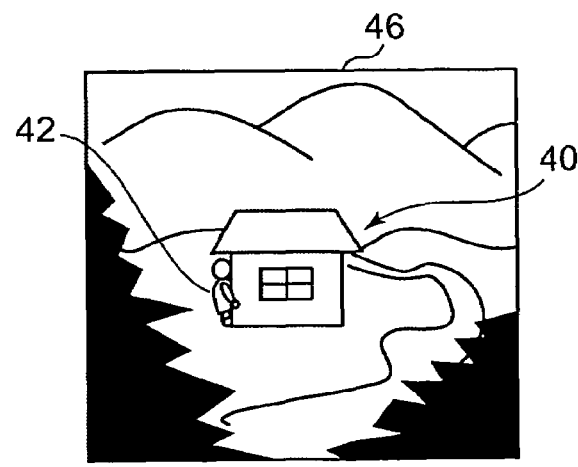

FIG. 6A and FIG. 6B depict conceptual diagrams illustrative of an exemplary size of the character 42 in the area 34 where the viewpoint distance is ranged from $N_0$ to $N_1$. FIG. 6A depicts the house 40 and the character 42 that are objects arranged in the world coordinate system by the model transforming module 206. FIG. 6B depicts a display image 46 shown on the display 12. The scaling computing module 208 increases the scaling for model data of the object corresponding to the character 42 ranging from one to S in the area 34 where the viewpoint distance is ranged from $N_0$ to $N_1$ as the viewpoint distance is increased. Therefore, the model transforming module 206 multiplies model data of the object corresponding to the character 42 by the scaling of one or greater to compute a new size of the object, and arranges the object in the world coordinate system (see FIG. 6A). By the process like this, the size of the character 42 shown in FIG. 6A is greater than the size of the character 42 shown in FIG. 5A.

Subsequently, multiple objects including the house 40 and the character 42 arranged in the world coordinate system are transformed to the viewpoint coordinate system by the view transforming module 214, perspective transformed to the screen coordinate system by the perspective transformation module 216, and shown on the display 12 as the display image 46 by the image output module 218 (see FIG. 6B). Thus, the entertainment apparatus 20 allows the character 42 positioned distant from the viewpoint position to be easily distinguished.

Figure 7A:
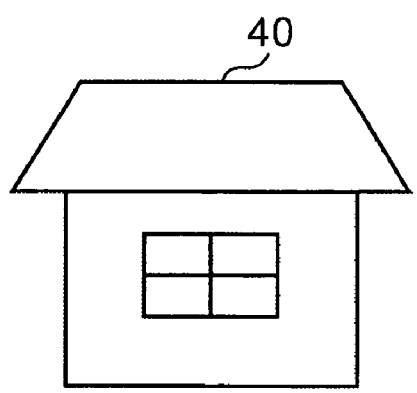
FIG. 7A and FIG. 7B are conceptual diagrams illustrative of an exemplary display image 46 when a viewpoint distance is $F_1$ or greater.
Figure 7B:
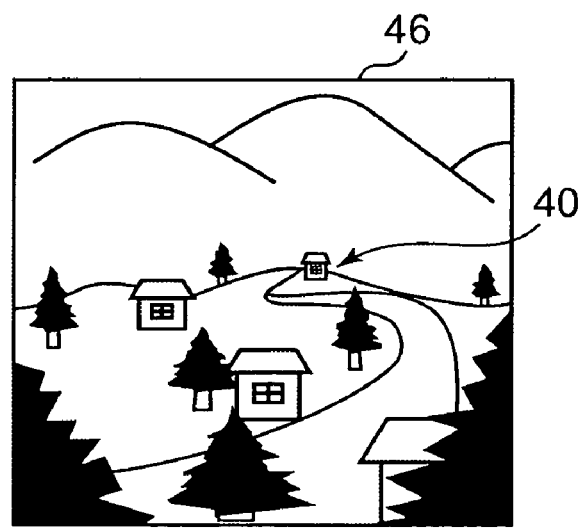

FIG. 7A and FIG. 7B depict conceptual diagrams illustrative of an exemplary display image 46 when the viewpoint distance is $F_1$ or greater. FIG. 7A depicts the house 40 that is an object arranged in the world coordinate system by the model transforming module 206. FIG. 7B depicts a display image 46 shown on the display 12. The scaling computing module 208 computes the scaling for model data of the object corresponding to the character 42 as zero in the range where the viewpoint distance is $F_1$ or greater. Thus, the model transforming module 206 does not arrange the object corresponding to the character 42 in the world coordinate system (see FIG. 7A). Model data of the object corresponding to the house 40 is arranged in the world coordinate system by the model transforming module 206 (see FIG. 7A).

Then, multiple objects including the house 40 arranged in the world coordinate system are transformed to the viewpoint coordinate system by the view transforming module 214, perspective transformed to the screen coordinate system by the perspective transformation module 216, and shown on the display 12 as the display image 46 by the image output module 218 (FIG. 7B). Therefore, the entertainment apparatus 20 can prevent perspective transformation of the object corresponding to the character 42 placed at the position distant from the viewpoint position $F_1$ or greater, and reduce the processing load.

FIG. 8 depicts a flow chart illustrating an exemplary operation of the entertainment apparatus 20. For example, at a predetermined timing such as turning on a power source, the entertainment apparatus 20 starts the process shown in the flow chart. First, the object control module 202 determines whether a manipulation input has been accepted from a player (user) through the control device 14 (S100) When the manipulation input has been accepted from the player (S100: Yes), the object control module 202 computes the position of the object corresponding to a player character in accordance with the game scenario stored in the scenario storing module 200 and the manipulation input having been accepted from the control device 14 (S104). Then, the object control module 202 computes the position of the object corresponding to the other character in accordance with the game scenario stored in the scenario storing module 200 and the position of the object corresponding to the player character (S106). Subsequently, the view computing module 212 computes the viewpoint coordinate of the player in the world coordinate system and the direction of a line of sight from the viewpoint coordinate in accordance with the manipulation input from the control device 14 and the position of each object computed by the object control module 202 (S108).

When no manipulation input is accepted from the player at Step 100 (S100: NO), the object control module 202 computes the positions of the objects corresponding to the player character and the other character in accordance with the game scenario stored in the scenario storing module 200 (S102), and the view computing module 212 conducts the process shown at Step 108.

Then, the depth computing module 210 computes the viewpoint distance from the viewpoint coordinate of the player to the coordinates of each object in the world coordinate system based on the position of each object controlled in accordance with the scenario stored in the scenario storing module 200, the viewpoint coordinate of the player computed by the view computing module 212, and the direction of a line of sight of each object (S110). Then, the scaling computing module 208 computes the scaling for model data of each object stored in the model data storing module 204 based on the function 30 described in FIG. 4 in accordance with the viewpoint distance of each object computed by the depth computing module 210 (S112).

Subsequently, the model transforming module 206 receives the scaling for each object computed by the scaling computing module 208, refers to the model data storing module 204, and multiplies model data of the corresponding object by the received scaling to compute a new size of each object. Subsequently, the model transforming module 206 arranges the object in the computed new size in the world coordinate system based on position information of each object computed by the object control module 202 (S114). Then, the view transforming module 214 transforms each object arranged in the world coordinate system by the model transforming module 206 to the viewpoint coordinate system where the viewpoint coordinate in the world coordinate system computed by the view computing module 212 are an origin point and the direction of a line of sight from the viewpoint coordinate is the z-axis (S116). Subsequently, the perspective transformation module 216 perspective transforms each of the vertex coordinates of the object in the viewpoint coordinate system transformed by the view transforming module 214 to the screen coordinate system in the viewpoint coordinate system. Then, the image output module 218 displays a part of the two-dimensional image perspective transformed to the screen coordinate system on the display 12 (S118), and the object control module 202 again conducts the process shown in Step 100.

Figure 9:
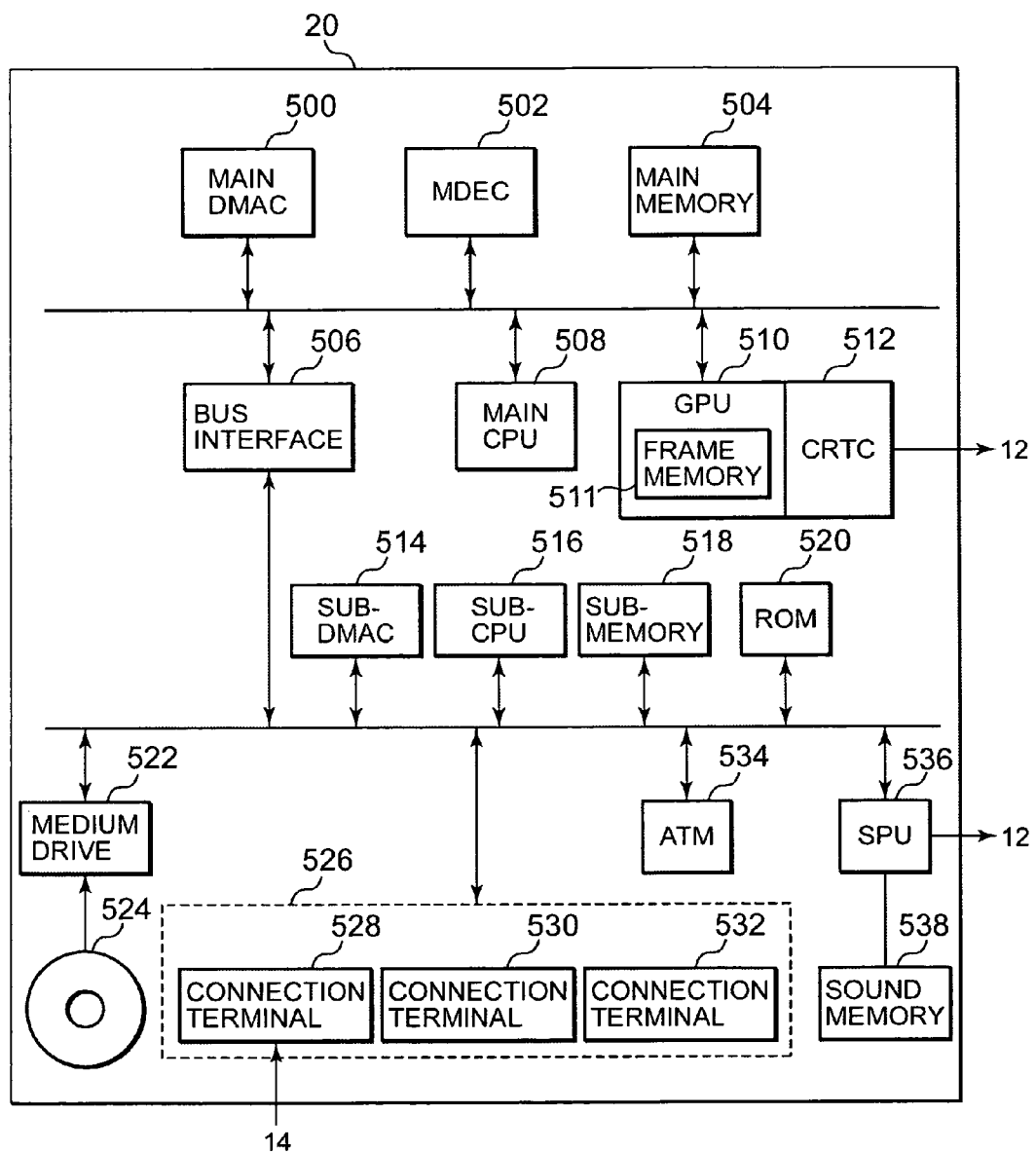
FIG. 9 is a diagram illustrating an exemplary hardware configuration of the entertainment apparatus 20.

FIG. 9 depicts a diagram illustrating an exemplary hardware configuration of the entertainment apparatus 20. As shown in the drawing, the entertainment apparatus 20 has two busses, a main bus B1 and a sub-bus B2 which are connected to multiple semiconductor devices, each device having a unique capability. These buses B1 and B2 are connected to or separated from each other through a bus interface 506.

The main bus B1 is connected to a main CPU 508 which is a main semiconductor device, a main memory 504 formed of RAM, a main DMAC (Direct Memory Access Controller) 500, a MPEG (Moving Picture Experts Group) decoder (MDEC) 502, and a graphic processing unit (GPU) 510 which incorporates therein a frame memory 511 to be graphic memory. The GPU 510 is connected to a CRTC (CRT Controller) 512 which generates video signals for displaying drawn data in the frame memory 511 on the display 12. The capability of the image output module 218 is implemented by the CRTC 512, for example.

The main CPU 508 reads a startup program from ROM 520 on the sub-bus B2 through the bus interface 506 when the entertainment apparatus 20 starts up, and runs the startup program to operate the operating system. Furthermore, the main CPU 508 controls a medium drive 522 as well as reads an application program and data such as scenario data and model data from the recording medium 524 mounted on the medium drive 522, and stores them in the main memory 504. Here, the application program allows the entertainment apparatus 20 to function as the scenario storing module 200, the object control module 202, the model data storing module 204, the model transforming module 206, the scaling computing module 208, the depth computing module 210, the view computing module 212, the view transforming module 214, the perspective transformation module 216, and the image output module 218.

Moreover, the main CPU 508 conducts a geometry process (coordinate value operation process) that expresses shapes and motions of the object with respect to three-dimensional object data (the coordinate value of vertices (representative points) of a polygon) formed of multiple basic patterns (polygon), for example, the three-dimensional object data is read out of the recording medium 524. Then, the main CPU 508 generates a display list that includes polygon definition information by the geometry process (specifications of the shape and drawing position of a polygon to be used, and the types, color tones, texture and the like of materials forming the polygon). The object control module 202, the scaling computing module 208, the depth computing module 210, and the view computing module 212 are implemented by the main CPU 508, for example.

The GPU 510 is a semiconductor device that holds graphic context (graphic data including polygon materials) and has a capability to draw a polygon on the frame memory 511 by reading required graphic context in accordance with the display list notified from the main CPU 508 for a rendering process (drawing process). Since the GPU 510 can also use the frame memory 511 as texture memory, it can paste a pixel image on the frame memory 511 as texture on the polygon to be drawn. The model transforming module 206, the view transforming module 214, and the perspective transformation module 216 are implemented by the GPU 510, for example.

The main DMAC 500 is a semiconductor device that conducts DMA transfer control over each circuit connected to the main bus B1 and conducts DMA transfer control over each circuit connected to the sub-bus B2 in accordance with the state of the bus interface 506. The MDEC 502 is a semiconductor device that operates in parallel with the main CPU 508 and has a capability to expand data compressed by MPEG (Moving Picture Experts Group) mode or JPEG (Joint Photographic Experts Group) mode and the like.

The sub-bus B2 is connected to a sub-CPU 516 formed of a microprocessor and the like, sub-memory 518 formed of RAM, a sub-DMAC 514, the ROM 520 in which a control program such as the operating system is stored, a sound processing semiconductor device (SPU (sound processing unit)) 536 which reads sound data stored in sound memory 538 and outputs it as audio output, a communication control module (ATM) 534 which sends and receives information with external devices through a network, not shown, and the medium drive 522 which mounts the recording medium 524 such as CD-ROM and DVD-ROM.

The recording medium 524 stores programs therein that allow the entertainment apparatus 20 to function as the scenario storing module 200, the object control module 202, the model data storing module 204, the model transforming module 206, the scaling computing module 208, the depth computing module 210, the view computing module 212, the view transforming module 214, the perspective transformation module 216, and the image output module 218. The recording medium 524 may be an optical recording medium such as DVD and PD, a magneto-optical recording medium such as MO, a tape medium, a magnetic recording medium, or semiconductor recording devices, etc. The entertainment apparatus 20 reads and implements these programs from the recording medium 524. Furthermore, the entertainment apparatus 20 may acquire these programs through communication lines such as the Internet network.

The input module 526 conducts various operations in accordance with the control program stored in the ROM 520. The sub-DMAC 514 is a semiconductor device that controls DMA transfer and the like over each circuit connected to the sub-bus B2 only in the state that the bus interface 506 separates the main bus B1 from the sub-bus B2. Moreover, the entertainment apparatus 20 has as input mechanisms a connection terminal 528 to which input signals from the control device 14 enter, and a connection terminal 530 and a connection terminal 532 which are used as multi-purpose connection terminals such as USB.

In addition, each of multiple capability blocks held by the entertainment apparatus 20 may be implemented in hardware by integrated logic ICs such as ASIC (Application Specific Integrated Circuit), and FPGA (Field Programmable Gate Array), and may be implemented in software by DSP (Digital Signal Processor) and a general purpose computer, or functional blocks implemented by partially hardware or software may be combined.

As apparent from the description above, the entertainment apparatus 20 of the embodiment conducts perspective transformation after the size of an object is varied in accordance with the distance from the viewpoint. Therefore, when the size of the object is increased as the distance from the viewpoint is increased, it can be much easier to distinguish the object at a distance. Furthermore, the entertainment apparatus 20 of the embodiment decreases the scaling for model data as the viewpoint distance is increased. Thus, in the case where the process of not showing an object on the screen when the size of that object on an image after perspective transformed is a predetermined size or below, the apparatus can decrease the number of the objects to be shown on the screen more quickly than a conventional apparatus and can reduce processing load. Moreover, the entertainment apparatus 20 of the embodiment can determine whether to show an object on the display 12 before perspective transformed in accordance with the distance from the viewpoint position. Therefore, it can reduce the probability to do perspective transformation in vain and can reduce the processing load more than the conventional configuration in which the size of an object after perspective transformed is evaluated to determine whether to show it on the display 12.

In addition, in the embodiment, the size of an object is varied in accordance with the distance from the viewpoint position. However, as another example, the entertainment apparatus 20 may vary an amount of characteristics of objects in accordance with the distance from the viewpoint position. For example, the entertainment apparatus 20 may increase the height to jump for an object to jump as the object is separated from the viewpoint position, may increase brightness for an object to shine as the object is separated from the viewpoint position, and may increase a face of an object corresponding to a character with a characteristic face as the object is separated from the viewpoint position. In this manner, the entertainment apparatus 20 may increase a so-called degree of deformation. Furthermore, in the case where the size of the object corresponding to the character with a characteristic face is increased as the object is separated from the viewpoint position, for example, model data having the different face size in every range of scaling is associated with an object and stored in the model data storing module 204 beforehand. The model transforming module 206 reads the corresponding model data from the model data storing module 204 in accordance with the scaling computed by the scaling computing module 208, and multiplies the read model data by the scaling received from the scaling computing module 208. Moreover, as another example, the entertainment apparatus 20 may highlight a particular object by increasing the transparency of objects around the particular object as separated from the viewpoint position.

As described above, the invention has been discussed with the embodiment, but the technical scope of the invention is not limited to the range described in the embodiment. In addition, it is apparent for those skilled in the art that various modifications and improvements can be applied to the embodiment. Besides, it is apparent from the claims that the modified and improved forms can also be included in the technical scope of the invention.

What is claimed is:

1. An object display device which transforms an object that is arranged in a world coordinate system and has a unique size defined by three-dimensional coordinates to a viewpoint coordinate system where viewpoint coordinates defined by the world coordinate system are an origin point and a direction of a line of sight from a viewpoint coordinate is a z-axis, perspective transforms the transformed object to a screen coordinate system being a plane perpendicular to the z-axis of the viewpoint coordinate system relative to the origin point of the viewpoint coordinate system, and displays a part of the screen coordinate system where the object has been perspective transformed on a display, the object display device comprising:

a depth computing module which computes a viewpoint distance that is a distance from the viewpoint coordinate to the object, or a distance from the viewpoint coordinate to the object in the direction of a line of sight in the world coordinate system;

a scaling computing module which uses a predetermined rule to compute scaling for the unique size of the object based on the viewpoint distance computed by the depth computing module;

an object arranging module which multiplies the unique size of the object by the scaling computed by the scaling computing module to compute the size of the object and arranges the object in the computed size in the world coordinate system;

a view transforming module which transforms the object arranged in the world coordinate system by the object arranging module to the viewpoint coordinate system;

a perspective transformation module which perspective transforms the object transformed by the view transforming module to a screen coordinate system relative to the origin point of the viewpoint coordinate system; and a display control module which displays a part of the screen coordinate system where the object is perspective transformed by the perspective transformation module on the display.

2. The object display device according to claim 1, wherein each of the objects is associated with a collision model having a unique size defined by three-dimensional coordinates and determining whether the objects are contacted with each other or overlapped with each other on the world coordinate system, and the object arranging module further multiplies the unique size of the collision model associated with the object by the scaling multiplied to the unique size of the object by the scaling computing module, computes the size of the collision model associated with the object, and arranges the collision model in the computed size in the world coordinate system.

3. The object display device according to claim 1, wherein each of the objects is associated with a collision model having a unique size defined by three-dimensional coordinates and determining whether the objects are contacted with each other or overlapped with each other on the world coordinate system, the scaling computing module further computes scaling for the unique size of the collision model by using a rule different from the rule that is applied to the object associated with the collision model based on the viewpoint distance computed by the depth computing module, and the object arranging module further multiplies the unique size of the collision model by the scaling for the collision model computed by the scaling computing module, computes the size of the collision model, and arranges the collision model in the computed size in the world coordinate system.

4. The object display device according to claim 1,
wherein the object display device displays multiple objects, each having an attribute, and
the scaling computing module applies a different rule for every attribute held by each of the multiple objects, and computes the scaling for each of the multiple objects.

5. The object display device according to claim 1, wherein the predetermined rule is a rule that the scaling computing module increases the scaling as the viewpoint distance is increased in a range to a first distance where the viewpoint distance is predetermined.

6. The object display device according to claim 5,
wherein the object display device displays multiple objects, each having an attribute, and
the scaling computing module applies a different rule for every attribute held by each of the multiple objects, and computes the scaling for each of the multiple objects.

7. The object display device according to claim 1,
wherein the predetermined rule is a rule that the scaling computing module decreases the scaling to zero as the viewpoint distance is increased in a range from a second distance to a third distance, and computes the scaling as zero in a range where the viewpoint distance is longer than the third distance, and
the object arranging module does not arrange the object for which the scaling is computed as zero by the scaling computing module in the world coordinate system.

8. The object display device according to claim 7,
wherein the object display device displays multiple objects, each having an attribute, and
the scaling computing module applies a different rule for the attribute held by each of the multiple objects, and computes the scaling for each of the multiple objects.

9. An object display method for an object display device which transforms an object that is arranged in a world coordinate system and has a unique size defined by three-dimensional coordinates to a viewpoint coordinate system where viewpoint coordinate defined by the world coordinate system are an origin point and a direction of a line of sight from the viewpoint coordinate is a z-axis, perspective transforms the transformed object to a screen coordinate system being a plane perpendicular to the z-axis of the viewpoint coordinate system relative to the origin point of the viewpoint coordinate system, and displays a part of the screen coordinate system where the object has been perspective transformed on a display,
wherein the object display device implements the steps of:
computing a viewpoint distance that is a distance from the viewpoint coordinate to the object, or a distance from the viewpoint coordinate to the object in the direction of a line of sight in the world coordinate system;
using a predetermined rule to compute scaling for a unique size of the object based on the computed viewpoint distance;
multiplying the unique size of the object by the computed scaling to compute the size of the object and arranging the object in the computed size in the world coordinate system;
transforming the object arranged in the world coordinate system to the viewpoint coordinate system;
perspective transforming the transformed object to a screen coordinate system relative to the origin point of the viewpoint coordinate system; and
displaying a part of the screen coordinate system where the object is perspective transformed on the display.

10. A storage medium readable by an object display device, the storage medium storing a program which controls the object display device which transforms an object that is arranged in a world coordinate system and has a unique size defined by three-dimensional coordinates to a viewpoint coordinate system where viewpoint coordinate defined by the world coordinate system are an origin point and a direction of a line of sight from the viewpoint coordinate is a z-axis, perspective transforms the transformed object to a screen coordinate system being a plane perpendicular to the z-axis of the viewpoint coordinate system relative to the origin point of the viewpoint coordinate system, and displays a part of the screen coordinate system where the object has been perspective transformed on a display,
wherein the object display device implements the steps of:
computing a viewpoint distance that is a distance from the viewpoint coordinate to the object, or a distance from the viewpoint coordinate to the object in the direction of a line of sight in the world coordinate system;
using a predetermined rule to compute scaling for a unique size of the object based on the computed viewpoint distance;
multiplying the unique size of the object by the computed scaling to compute the size of the object and arranging the object in the computed size in the world coordinate system;
transforming the object arranged in the world coordinate system to the viewpoint coordinate system;
perspective transforming the transformed object to a screen coordinate system relative to the origin point of the viewpoint coordinate system; and
displaying a part of the screen coordinate system where the object is perspective transformed on the display.

11. An entertainment apparatus which implements a game having a capability that changes coordinates of an object arranged in a world coordinate system in accordance with a manipulation input by a player, perspective transforms the changed object, and displays it on a display, the entertainment apparatus comprising:
an input module which accepts a manipulation from the player;
an object control module which changes the coordinates of the object in the world coordinate system in accordance with the manipulation from the player accepted by the input module;
a view computing module which computes viewpoint coordinate in the world coordinate system and a direction of a line of sight from the viewpoint coordinate in accordance with the manipulation from the player accepted by the input module;
a model data storing module which stores a unique size defined by three-dimensional coordinates for every object; and
an object display module which transforms an object with a unique size to be arranged in the world coordinate system to a viewpoint coordinate system where the viewpoint coordinate computed by the view computing module are an origin point and the direction of a line of sight computed by the view computing module is a z-axis, perspective transforms the transformed object to a screen coordinate system being a plane perpendicular to the z-axis of the viewpoint coordinate system relative to the origin point of the viewpoint coordinate system, and displays a part of the screen coordinate system where the object has been perspective transformed on a display, wherein the object display module includes:

a depth computing module which computes a viewpoint distance that is a distance from the viewpoint coordinate to the object, or a distance from the viewpoint coordinate to the object in the direction of a line of sight in the world coordinate system;

a scaling computing module which uses a predetermined rule to compute scaling for a unique size of the object based on the viewpoint distance computed by the depth computing module;

an object arranging module which multiplies the unique size of the object by the scaling computed by the scaling computing module to compute the size of the object and arranges the object in the computed size in the world coordinate system;

a view transforming module which transforms the object arranged in the world coordinate system by the object arranging module to the viewpoint coordinate system;

a perspective transformation module which perspective transforms the object transformed by the view transforming module to a screen coordinate system relative to the origin point of the viewpoint coordinate system; and a display control module which displays a part of the screen coordinate system where the object is perspective transformed by the perspective transformation module on the display.

* * * * *